United States Patent [19]

Arroyo et al.

[11] Patent Number: 4,907,150
[45] Date of Patent: Mar. 6, 1990

[54] APPARATUS AND METHOD FOR SUSPENDING AND RESUMING SOFTWARE APPLICATIONS ON A COMPUTER

[75] Inventors: Ronald X. Arroyo, Elgin; Michael N. Day, Austin; Jimmie D. Edrington, Georgetown; James T. Hanna, Austin; Gary T. Hunt, Austin; Steven T. Pancoast, Austin, all of Tex.

[73] Assignee: International Business Machines Corporation, Armonk, N.Y.

[21] Appl. No.: 225,570

[22] Filed: Jul. 26, 1988

Related U.S. Application Data

[63] Continuation of Ser. No. 820,459, Jan. 17, 1986, abandoned.

[51] Int. Cl.$^4$ .................. G06F 11/30; G06F 12/16
[52] U.S. Cl. .................................. 364/200; 371/14
[58] Field of Search ... 364/200 MS File, 900 MS File; 371/12, 14, 66

[56] References Cited

U.S. PATENT DOCUMENTS

| | | | |
|---|---|---|---|
| 3,801,963 | 4/1974 | Chen | 371/66 X |
| 3,959,778 | 5/1976 | Brette | 340/172.5 |
| 4,079,448 | 3/1978 | N'Guyen et al. | 364/200 |
| 4,096,560 | 6/1978 | Footh | 364/200 |
| 4,198,698 | 4/1980 | Ho et al. | 365/226 |
| 4,458,307 | 7/1984 | Gould et al. | 364/200 |
| 4,611,289 | 9/1986 | Coppola | 371/66 X |

OTHER PUBLICATIONS

IBM TDB, vol. 27, No. 4A, Sept., 1984, "Dynamic Refresh of I/O Control Data" to Cwiakala et al., p. 1917.

Primary Examiner—David L. Clark
Attorney, Agent, or Firm—J. F. Villella, Jr.; H. St. Julian

[57] ABSTRACT

A method and apparatus for powering down a computer system while saving the state of the system at power down is disclosed. The system maintains the capability to suspend the execution of an application program operating on the system at any point and resuming execution of the application program at that same point at a later time. The time at which the system may be powered down and then powered back up again is totally arbitrary and depends only upon the user of the system. At the time the system is powered off, the contents of all active registers as well as the states of all I/O devices in the system are stored in a special save area of system memory. This special save area is provided with power during the suspended time in order to retain the state of the system at the time it was powered down. By using this special save suspend area, the main memory area of the system is available to any application programs independently of the system save memory requirements. Additionally, the system may be powered on and off under software control thereby providing the capability for unattended system operation using an alarm function.

19 Claims, 10 Drawing Sheets

APPARATUS AND METHOD FOR SUSPENDING AND RESUMING SOFTWARE APPLICATIONS ON A COMPUTER

This is a continuation of application Ser. No. 06/820,459 filed January 17, 1986, now abandoned.

DESCRIPTION

1. Technical Field

This invention relates to the powering on and off of a computer system, and more particularly to the capability to suspend and resume a software application running on the computer system during a power off/on cycle.

2. Background Art

In the information processing environment, it would be very valuable to be able to suspend and resume programs running on a central processing unit (CPU) during times when the CPU is powered off and on. It would be especially valuable to be able to resume the programs at the exact execution point at which they were suspended during a power off occurrence. The ability to suspend and resume an application program during a power off/power on cycle is very important for a portable computer. A typical user of such a portable computer would most likely be cycling his computer off and on much more frequently than a user of a computer that is fixed in one location. It would be very desirable and highly productive for the user of such a portable computer to be able to instantly power on and resume system operation at the point at which execution was suspended.

A further advantage of such a suspend and resume feature is found in the battery operated computer field. By eliminating the restarting of a program from the beginning, battery life would be extended by eliminating the disk drive operations usually required for an application and a data base which have to be reloaded at power on.

A major requirement for such a suspend and resume feature is that the state of the CPU and the computer registers and peripherals must be interrogated and stored at the suspend time so that they may be restored accurately at the time of resumption. Consequently, in effect the entire system's state must be saved including control and memory mechanisms associated with the display, system timing mechanisms, interrupt and keyboard controllers, as well as communication controllers. A second major requirement to be able to perform an accurate suspend/resume function is that the contents of the memory must be retained. As part of this latter requirement, some power must be supplied to the memory while the system is off in order to save its contents. As part of this saving requirement, it would be desirable for the system's state to be saved in a special area separate from main memory that is not accessible to any application programs running on the system. In this manner, main memory space is not used up during a suspend/resume operation.

Large computing systems have been known to have some type of early-power-off warning system to enable the computing system to go down without destroying large quantities of data. However, none of these systems has the capability to restore the hardware to its pre-power down state. Typically, what is done is that the system is restarted and reloaded from the beginning. U.S. Pat. No. 4,458,307 discloses a data processing system having a volatile main memory which includes a data save controller for protection against loss of the memory during a power failure. At the first sign of a power supply failure, non-postponable tasks are completed and data saving is accomplished by storing the contents of volatile processor registers in the main memory area. At the conclusion of a power failure, the contents of the main memory are then transferred back to the volatile registers for reinitialization and restart. Power fault detection circuitry is required to detect a power failure sufficiently in advance to be able to transfer from volatile to non-volatile storage areas.

A similar technique is found in U.S. Pat. No. 3,959,778 wherein data is transferred from a volatile main memory of a data processor to a peripheral permanent storage unit upon failure of the main supply to the data processor. Circuitry is provided to read the contents of the main memory into the selected permanent storage unit within a time period short enough so that perishable data in the main memory is not lost.

U.S. Pat. No. 4,096,560 describes a protection circuit which disables control signals to a microprocessor and to a memory to prevent the loss of stored data from the memory during power fluctuations. The control signals inhibit the reading or writing of data into the memory and maintain the microprocessor in a reset mode of operation during the power level fluctuations and interruptions.

DISCLOSURE OF THE INVENTION

It is an object of this invention to provide an apparatus and method for suspending and resuming a software program running on a computer system during a power off/on cycle.

It is another object of this invention to provide an apparatus and method for resuming a software application at the exact point at which it was running before a power off operation.

It is yet another object of the invention to provide an apparatus and method for saving the state of all memory and I/O devices in a computer system during a power off operation.

In accordance with these and other objects of the invention, an apparatus and method are provided for enabling a user of a computer system to suspend execution of a program by powering down the system while maintaining the capability to restart execution at the exact point at which it was suspended after powering back on. The user of such a system may arbitrarily suspend execution at any point in time and similarly resume execution at any point in time without having to restart and reload the program that was running on the system at the time it was powered down. At the time the computer system is powered down, the contents of all active registers as well as the states of all I/O devices in the system are stored in a special save area of the memory. This special save area is provided with power during and after the suspend operation, thereby retaining the state of the machine while it is powered down.

The computer system disclosed herein includes a display, memory, timers, interrupt apparatus, a keyboard, and communication devices. Consequently, at the time the system is powered down, the entire state of the machine must be saved including that of the display controller, the memory, system timers, interrupt controllers, keyboard controllers, communication controllers and central processor registers. The computer system state is saved in a special save area that is not accessible to any application program running on the system. As a result of this, all of the main memory area is available to application programs independently of the system save requirements demanded by the special system save area.

As an additional capability, the computer system may be powered on and off under software control. Attendant with the capability to power on and off under software control is the capability to allow unattended operation of the computer system. A time of day alarm function built into the system enables the system to be powered on, and resumed at predetermined times.

BEST MODE FOR CARRYING OUT THE INVENTION

Figure 1:
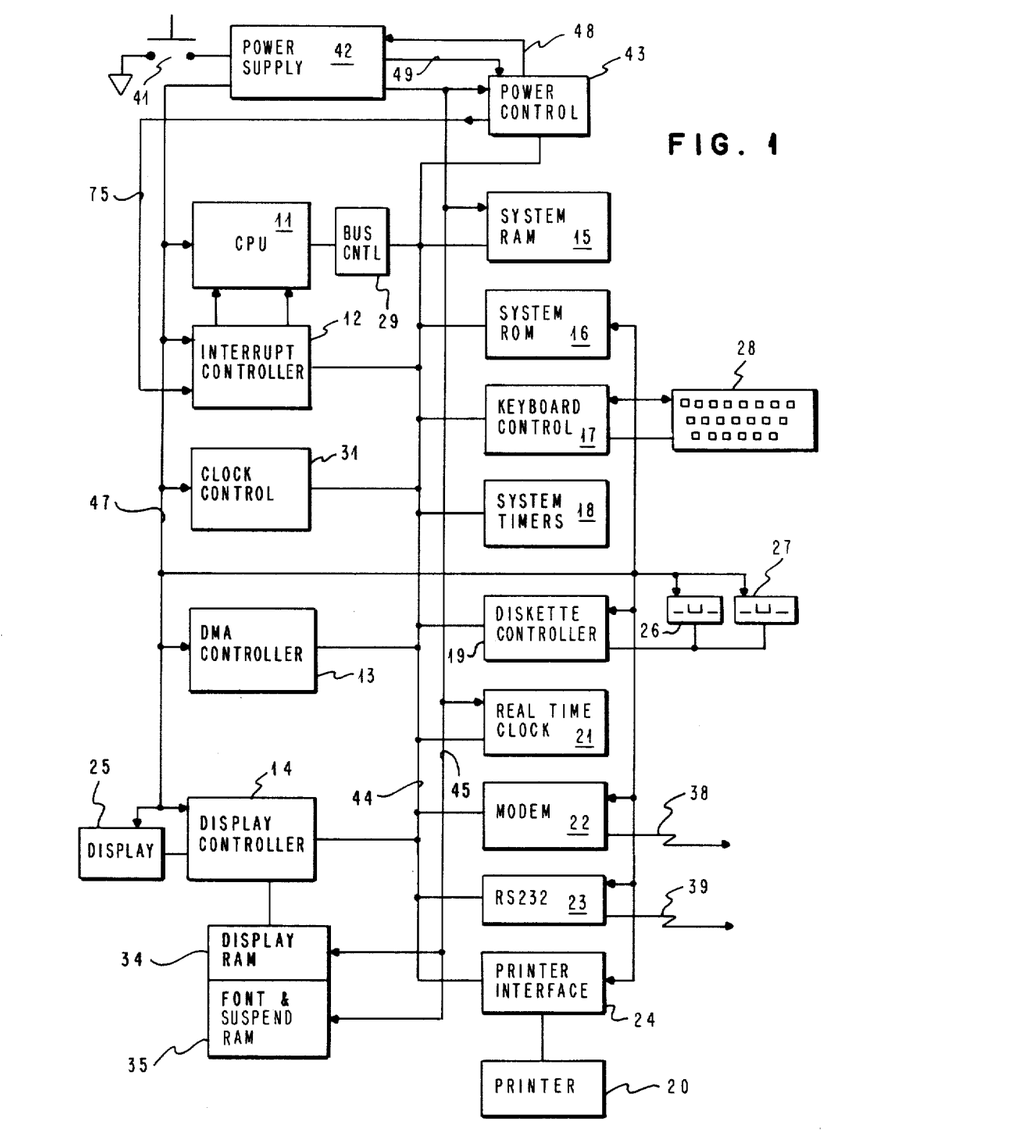
FIG. 1 is a functional block diagram of the system according to the present invention.

The overall system of the invention is shown in FIG. 1. Continuous power is supplied from power supply 42 to power control 43 over line 45. As can be seen, continuous power is also supplied from power supply 42 on line 45 to system RAM 15, real time clock 21, display RAM 34 and display font/suspend RAM 35. The operation of on/off switch 41 to power supply 42 controls the operation of line 49 which communicates between power supply 42 and power control 43. When on/off switch 41 is depressed, line 49 causes power control 43 to provide a power enable signal over line 48 to power supply 42. In this manner, switched power is provided over line 47 to CPU 11, interrupt controller 12, clock control 31, DMA controller 13, display controller 14 and display 25. Power control 43 also provides a suspend non-maskable interrupt (NMI) to interrupt controller 12. Note that switched power is also provided on line 47 to system ROM 16, keyboard control 17 and keyboard 28, diskette controller 19, diskette drives 26 and 27, modem 22, RS232 communication interface 23 and printer interface 24.

Modem 22 communicates with an external device over line 38 and the RS232 interface 23 communicates with an external device over line 39. Bus controller 29 controls the flow of data among the following devices: power control 43, CPU 11, interrupt controller 12, clock control 31, DMA controller 13, display controller 14, printer interface 24, RS232 communication interface 23, modem 22, real time clock 21, diskette controller 19, system timers 18, keyboard control 17, system ROM 16 and system RAM 15. As can be seen, the communication of data among these aforementioned devices transpires over bus 44. Note also there is data communication between display controller 14 and display 25, between diskette controller 19 and diskette drives 26 and 27, and between keyboard control 17 and keyboard 28.

The suspend and resume operations during a power on/off cycle will now be described in more detail with respect to FIGS. 3a-3c and 4a-4e, respectively. In operation, when power on/off switch 41 is depressed, a suspend NMI is generated to initiate the saving of the system's present state within approximately a two second time period. As shown in step 84, the first operation performed subsequent to power switch 41 being depressed is to save the contents of all of the registers of CPU 11. Subsequently, all system interrupts are disabled and a system suspend flag is cleared as depicted in step 85. The clearing of the system suspend flag prevents the system from being restarted from the beginning when the system is resumed unless the system is successfully suspended. As indicated in step 86, the diskette drives and the display are turned off and any printer operation is stopped while any audio output is disabled.

Figure 3A:
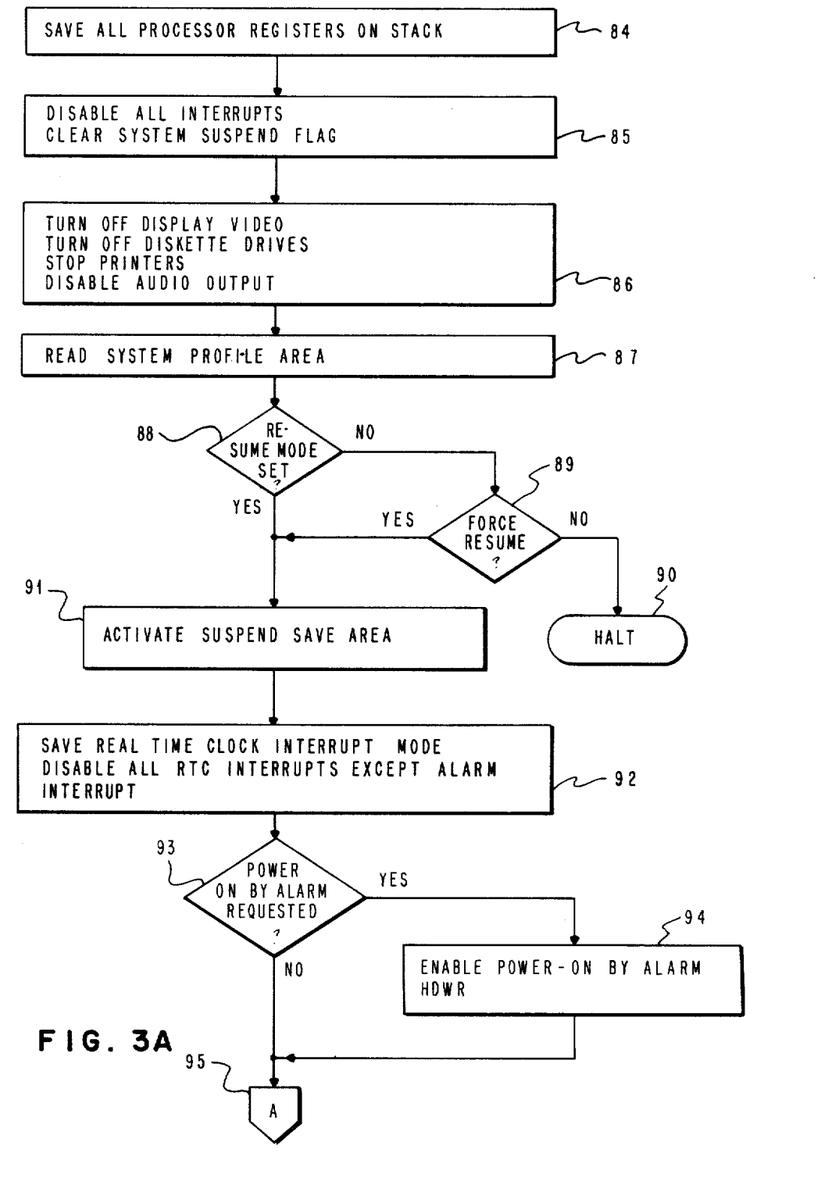
FIGS. 3a-3c are flow charts depicting the operations which occur during a power down operation.

In step 87, a system profile area in RAM 15 is read. In this area, a user of the system can indicate that it is desired to have the system restart from the beginning of any suspended application program rather than having it resume at its suspended execution point. In decision block 88, a determination is made as to whether or not a resume mode is set, i.e., whether or not the system will resume at the suspended execution point. If the answer is no, then a second determination is made as to whether or not a "force" resume is set. This is done in block 89. A "force" resume overrides the information in the system profile area that was read in step 87 so as to force the system to resume at its suspended execution point. This "force" resume would be used to prevent loss of the system's state if the power supplied to the system were in danger of running out. In the preferred embodiment disclosed herein, the power is supplied to the system by a battery, i.e., power supply 42 is a battery. In this manner, the state of the system can be saved if the battery runs low during the execution of an application program without losing data which cannot be recovered. If the answer to decision block 89 is no, then no saving of the system is done in the event of power off. However, if the answer to either decision block 88 or decision block 89 is yes, then as indicated in step 91, a special save area in RAM 35 is activated. In accordance with the activation of this special suspend save area in RAM 35, the real time clock 21 interrupt mode is saved and all real time clock interrupts except an alarm interrupt are disabled, i.e., only the alarm function of the system has power remaining on. In decision block 93, a determination is made as to whether or not an alarm power-on-activation has been requested. If there are no alarms set, then operation proceeds to step 95 which will be explained with respect to FIG. 3b. However, if an alarm power-on has been requested, then as indicated in step 94, the alarm hardware provides an enable-power-on so that at the time an alarm goes off, if the system has been suspended it will then resume execution at the point at which it was suspended.

Figure 3B:
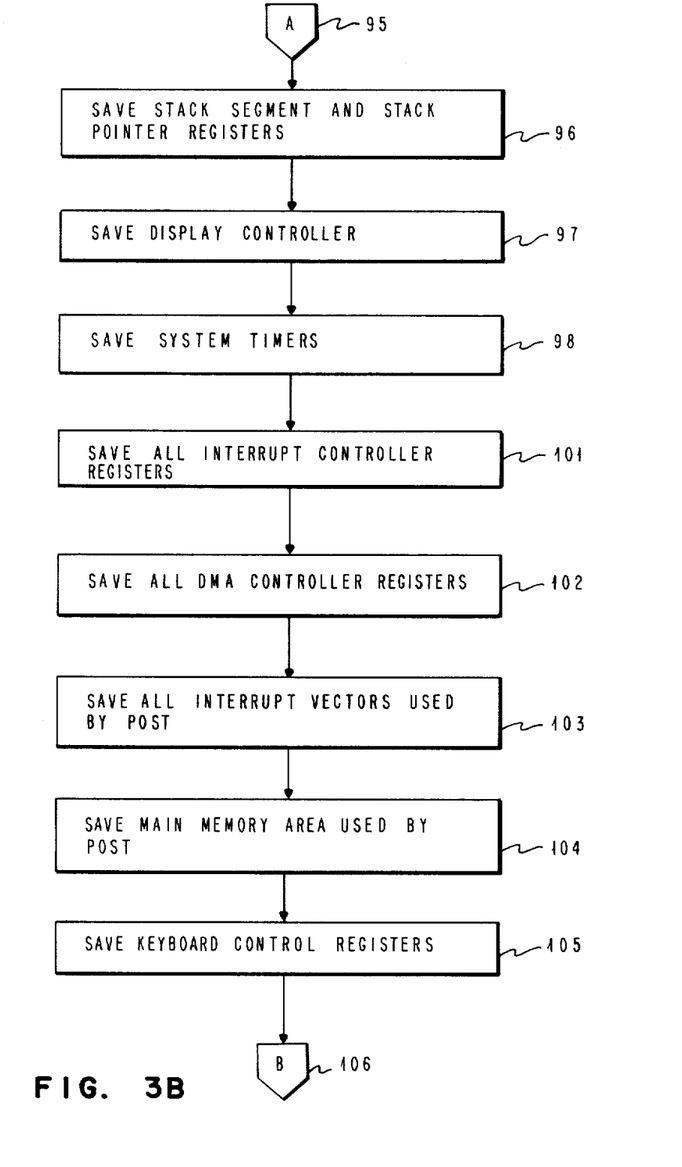

Having made a determination as to whether or not a resume mode has been set and a second determination as to whether or not an alarm function is required, a number of functions are carried out subsequent to step 95. These are as shown in FIG. 3b. As indicated in step 96, the stack segment and stack pointer registers within CPU 11 are saved. As indicated in steps 97 and 98, the state of the display controller 14 and the state of system timers 18 is each saved. As shown in steps 101 and 102, the registers of both interrupt controller 12 and DMA controller 13 are saved. Additionally, (as shown in step 103) all interrupt vectors which are used by the system to perform a power on self test (POST) when the system is restarted are saved. To facilitate the POST, the main area in RAM 15 used by POST is saved as disclosed in step 104. Finally, as shown in step 105, the state of the registers of keyboard control 17 is saved.

Figure 3C:
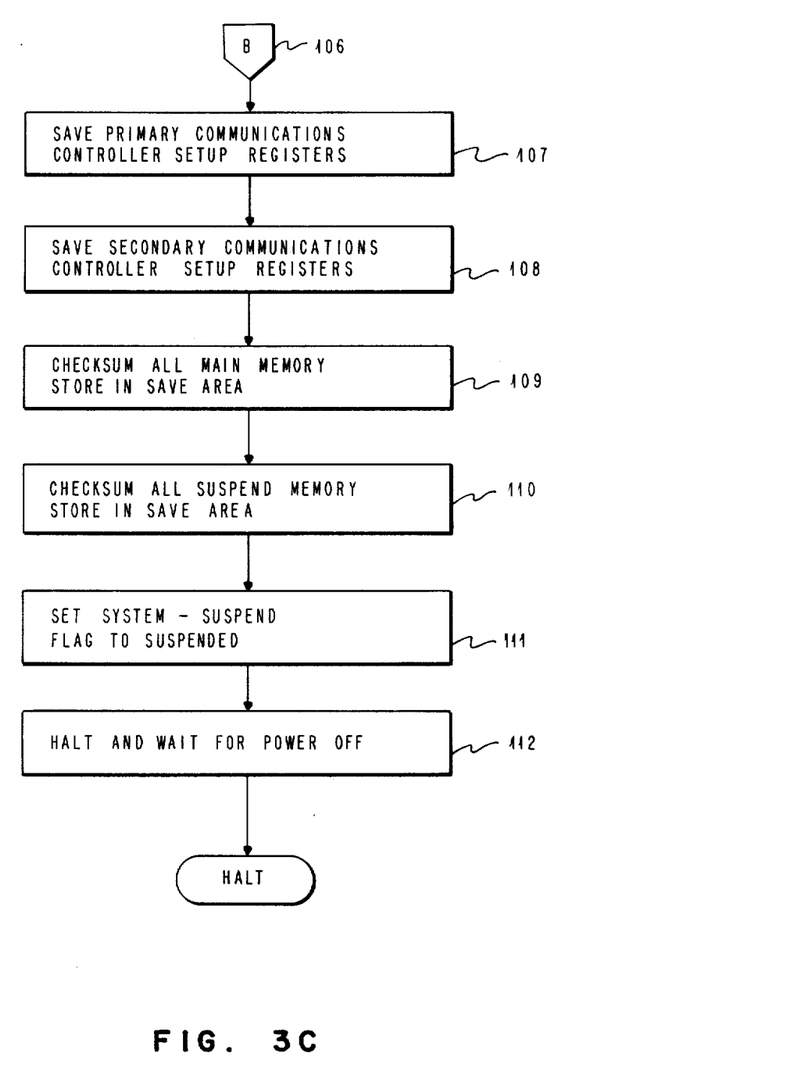

The saving of the system's state continues as shown in step 106 in FIG. 3c. Each of modem 22 and RS232 communication interface contains controller setup registers for holding information which is desired to be communicated over lines 38 and 39, respectively. Modem 22 is considered the primary communication device while RS232 communication interface 23 is considered the secondary communication device. As shown in steps 107 and 108, the registers containing information which is to be communicated is saved at the time of power down or system suspend. Note that any information that is being communicated over lines 38 and 39 at the time of a power down will be lost. Additionally, as shown in steps 109 and 110, both the main memory and the special suspend memory have a check sum procedure performed on them and their contents are stored in the special save area. These operations are done to make sure that the contents of memory have not changed during the suspend operation. Finally, in steps 111 and 112, a system suspend flag is set, further execution is halted and the system waits for the expiration of the two second time period after the suspend operation has been initiated. Further operation then halts until a system resume operation is initiated.

FIGS. 4a–4e depict the operations and functions performed during a power on resume operation. Once again, it is to be noted that a successful power on resume operation enables the application program that was running on the computer system to begin executing at the exact point at which execution ceased at the time the power down suspend operation was performed. As indicated in step 113, power is restored to the system either by an operator pressing on/off switch 41 or by a preset alarm. In step 114, a hardware reset flag is read in order to determine whether or not the user wishes to run a new application program, thereby aborting the resumption of the system's state at power down. If no reset flag has been set, then the resumption process will proceed at the last execution point. In decision block 115, a determination is made as to whether or not there has been either an operator or battery loss abort, thereby indicating the reloading of the application program at its beginning. If either of these conditions occur, then a system suspend flag is reset as shown in step 116. However, if neither of these conditions occur, then the suspend save area in RAM 35 is accessed and a checksum function is performed. If the checksum function indicates an error, then the system suspend flag is reset and the application restarts at the beginning and not at the previous execution point. However, if the checksum of the suspend save area is successful, then a checksum function is performed on the main memory of RAM 15 as indicated in step 121. Once again, if there is an error found, then the system suspend flag is reset, an error code is issued, and the application program must restart at the beginning. However, if the latter checksum operation is successful, then a determination is made in decision block 125 (see FIG. 4b) as to whether or not a suspend flag has been set. If a suspend flag has not been set, then the state of the system must be restored to its beginning.

Figure 4A:
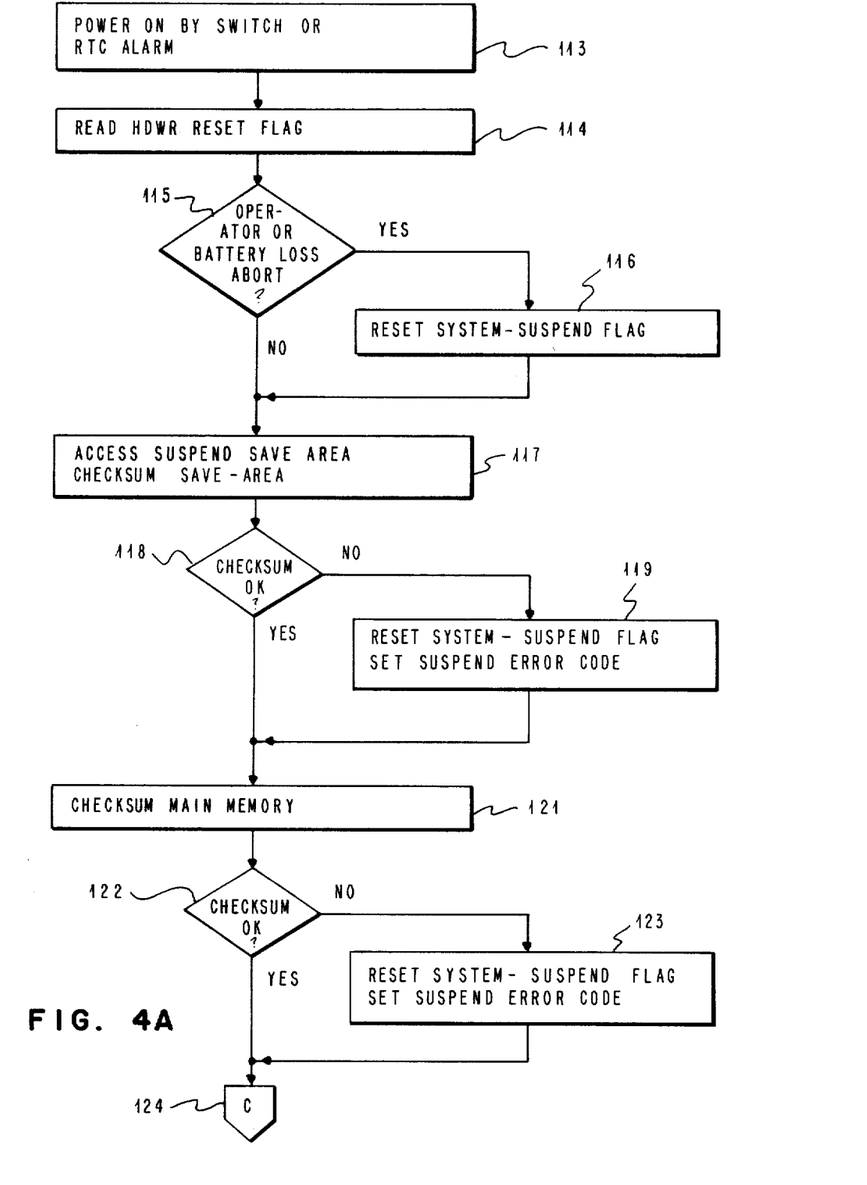
FIGS. 4a-4e are flow charts depicting the powering back on of the system following a power off sequence.
Figure 4B:
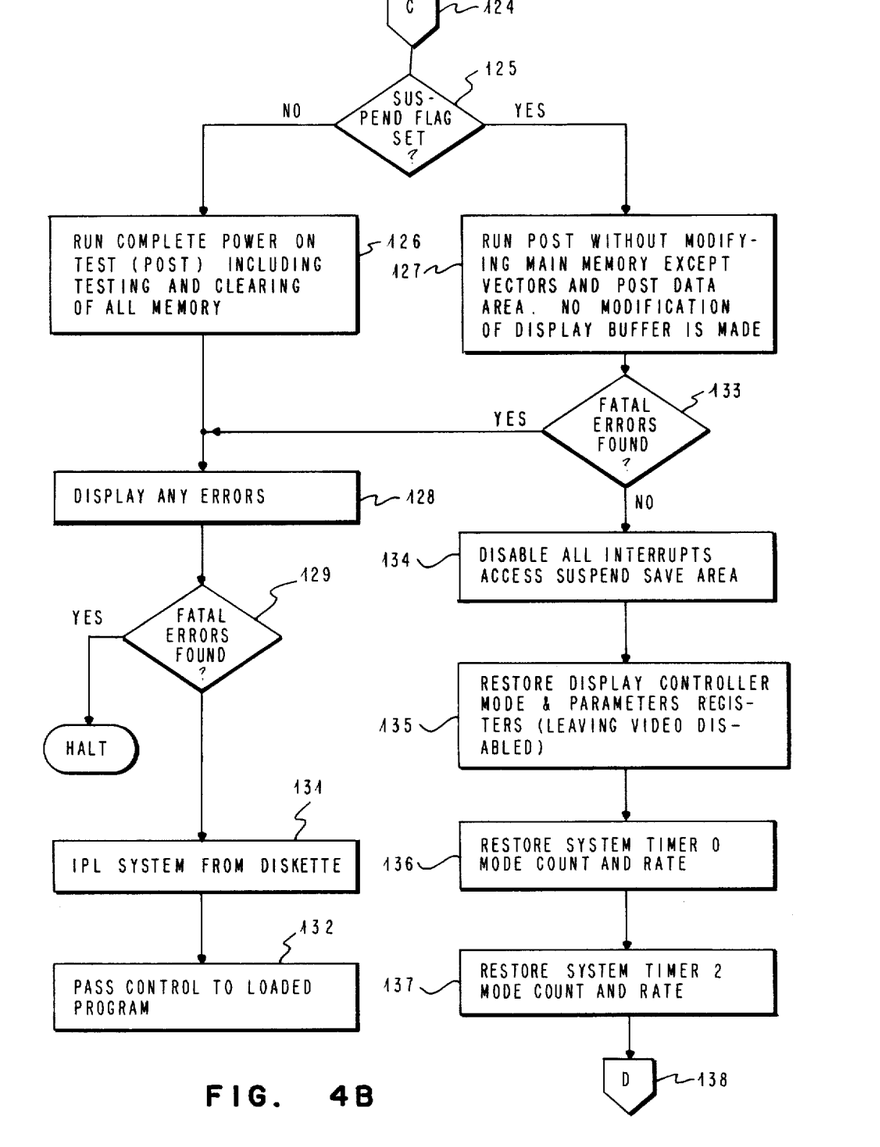

As indicated in step 126, a complete POST function is performed and all memory is cleared. Subsequently, any errors which have occurred are displayed as shown in step 128 and a determination is made as to whether or not any fatal errors have been found. If any fatal errors have been found, then the system is shut down. However, if no fatal errors have been found, then an initial program load is done on the system from one of diskette drives 26 or 27 and control is then passed to the particular application program which has been loaded into the system.

Figure 4C:
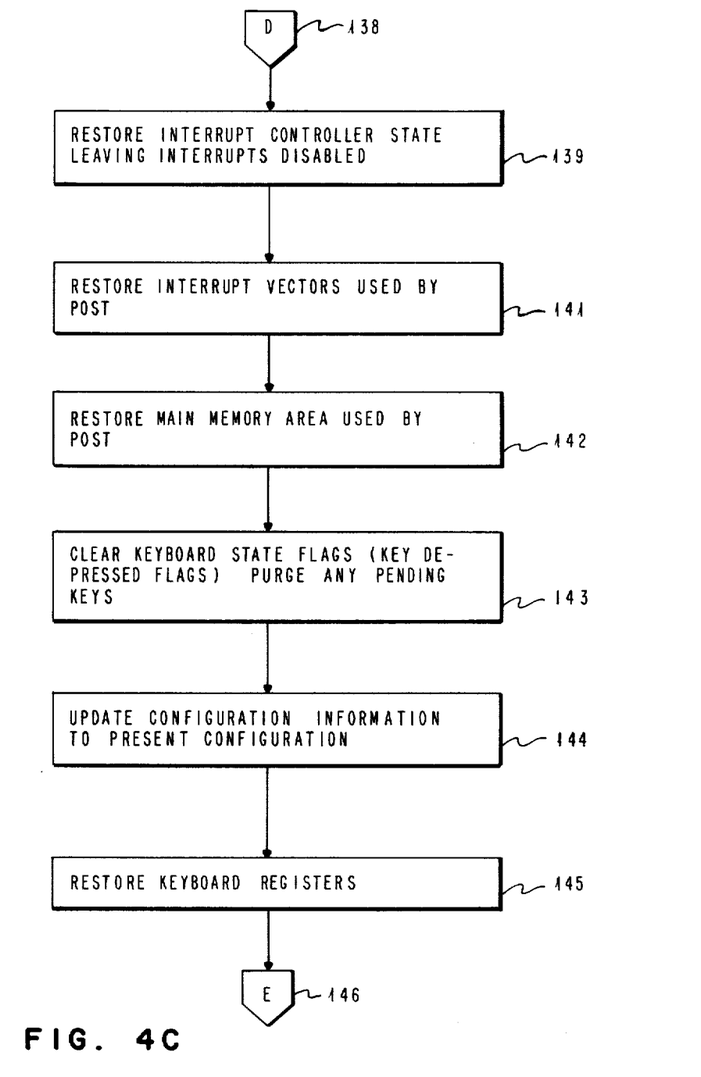

The yes branch of step 125 follows if the application program that was suspended is to be resumed at its previous execution point. In step 127, a power on self test (POST) is performed without significantly modifying the main memory of RAM 15 and without modifying font/suspend RAM 35 and display RAM 34. However, if any fatal errors have been found as shown in decision block 133, then the errors are displayed and the system is shut down. When no fatal errors have been found, then resumption proceeds with all interrupts being disabled and the suspend save area in RAM 35 being accessed. Additionally, the registers of display controller 14, and system timers 18, are restored to their previous states as shown in steps 135 through 137. The resumption process continues with step 139 as shown in FIG. 4c. At this point, interrupt controller 12 is restored and the main memory area of RAM 15 which was used by POST is also restored. Additionally, any key depressed flags of keyboard 20 are cleared and any pending keys in keyboard 28 are purged, while the system configuration information is updated due to possible changes while powered off. Finally, the registers of keyboard control 17 are restored.

Figure 4D:
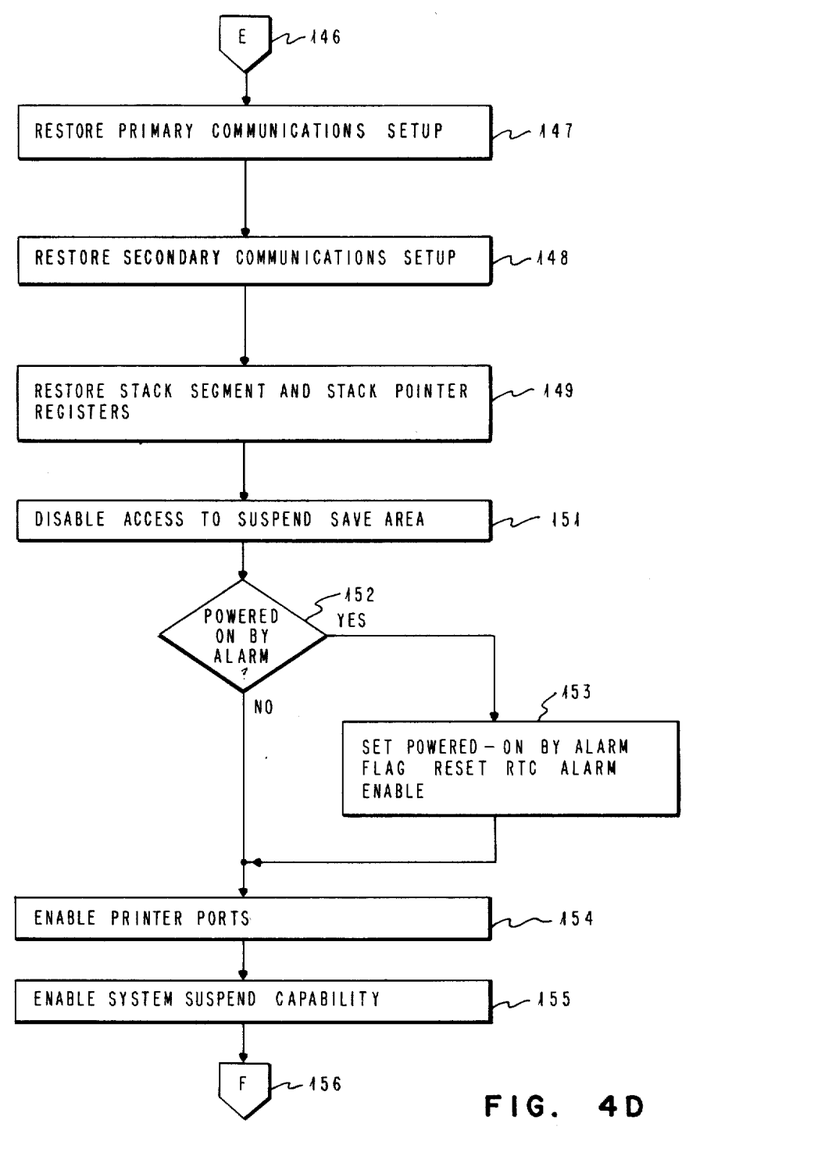

Continuing, the communication setups of modem 22 and RS232 communication interface 23 are restored as shown in steps 147 and 148 (see FIG. 4d). Next, the stack segment and stack pointer registers of CPU 11 are restored and the suspend save area in RAM 35 is disabled so that at this point application program access to this space is prohibited.

In decision block 152, a determination is made as to whether or not the system has been powered back on by an alarm that has been previously set. If the answer is affirmative, then the alarm of real time clock 21 is reset and a memory flag set, thereby informing the application program that is currently loaded that the system is currently unattended by a user. Continuing, the printer 20 is enabled. Finally, in step 155, the capability of the system to once again suspend an application program is enabled.

Figure 4E:
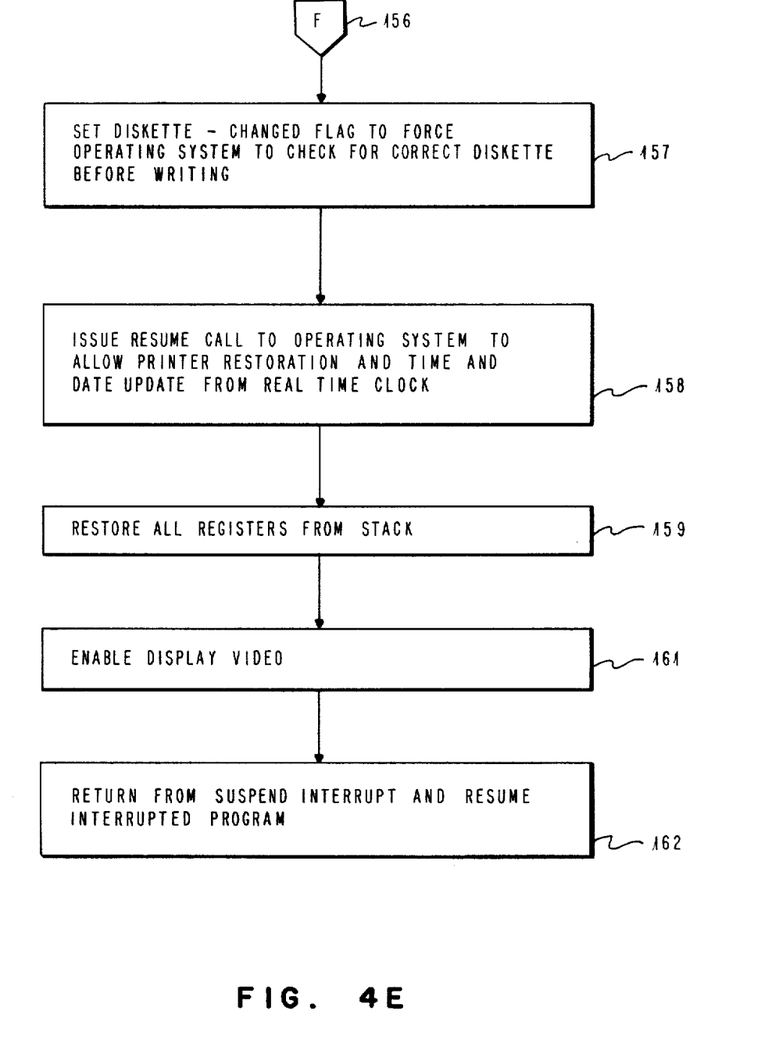

The last operations which are performed to complete the resume operation are detailed in FIG. 4e. In step 157, a change flag on both diskettes 26 and 27 is set to force the operating system program to check that the correct diskette is loaded in one of diskette drives 26 or 27 before a write operation proceeds. This is to assure that the diskette that will be written on is the same one that was being written on at the time the suspend operation was initiated. The state of diskette controller 19 could be saved and restored, however, in the best mode of this invention, it is not because the operation will be aborted with "possible diskette changed" status and it is up to the operating system to validate the diskette and retry the operation. Subsequently, a resume call is issued to the operating system program thereby allowing restoration of printer 20 to its previous state and enabling an updating of the present time and date from real time clock 21. By so doing, the correct time and date may be shown on display 25. All registers in CPU 11 are restored from the stack and a signal is provided to display controller 14 to enable video data to be shown on display 25. Finally, a return from the suspend interrupt is executed and the application program that was suspended is resumed at its previous execution point.

Figure 2:
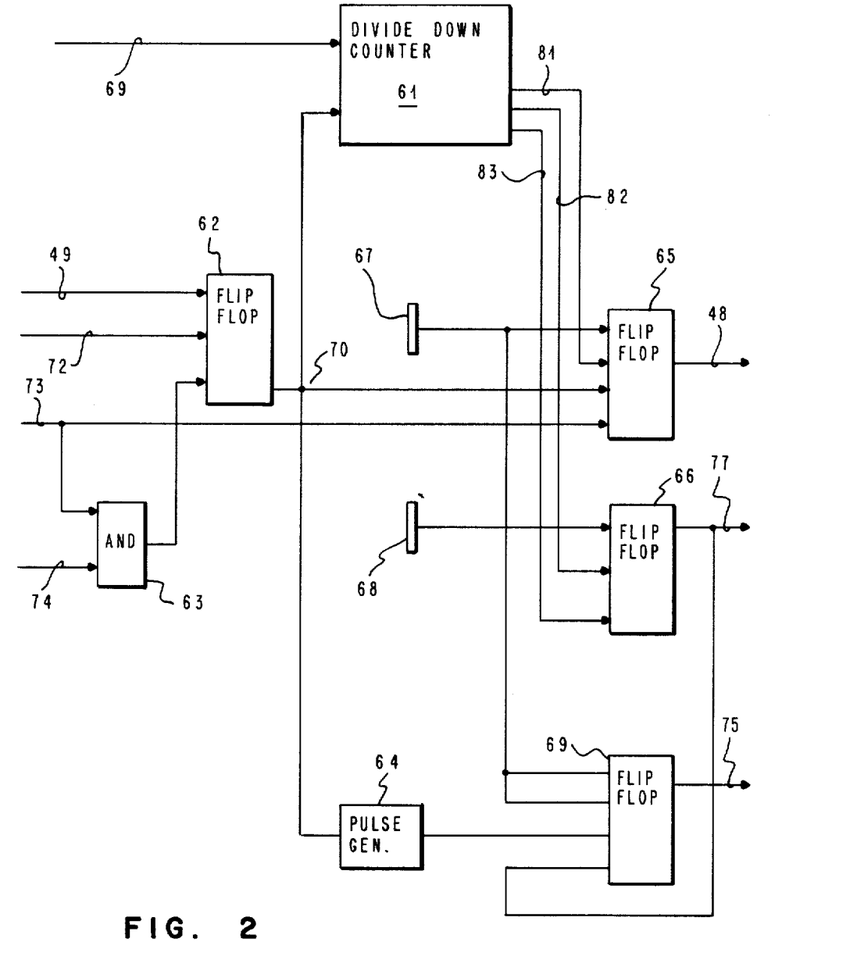
FIG. 2 is a block diagram of the power control section used to power down and power up the system according to the present invention.

The operation of the logic used to control the powering down of the system during a system suspend operation will be explained in more detail hereinafter with respect to FIG. 2. When the power control circuit of FIG. 2 is first powered on, flip-flops 62, 65, 66 and 69 are all reset using the system reset signal on line 73. The power enable signal on line 48 is at a low logic state thereby indicating that the rest of the system is not powered on. In order to activate the power enable signal on line 48 to turn on the system, power switch 41 is depressed which in turn places a pulse on the power switch signal of line 49. Alternatively, the system may be turned on by a real time clock alarm signal on line 72 going to a low logic state thereby signaling the turning on of power by the alarm function. Flip-flop 62, which is a toggle-type flip-flop, will then change states causing the signal on line 70 to go from a high logic state to a low logic state. Since the set input for flip-flop 65 is on line 70, flip-flop 65 is then set and the power enable signal on line 48 becomes active.

When the system is powered on, a reset signal is generated by the circuit of FIG. 2 in the following manner. When the signal on line 70 transits from a high to a low logic state, a 250 millisecond count is begun. After 100 milliseconds have elapsed, the signal on line 82 is raised to a high logic state thereby causing flip-flop 66 to clock in a high signal for the reset signal of flip-flop 66. After the 250 millisecond time period has elapsed, the signal on line 83 goes to a low state which resets flip-flop 66 thereby causing the reset signal of flip-flop 66 to go to a low state. Consequently, 100 milliseconds after the power enable signal becomes active, the reset signal will become active for a period of 150 milliseconds.

To turn off the computer system, power switch 41 is again depressed, and another pulse is placed on the power switch signal on line 49. Note that the system may also be powered off by a software request, thereby causing the software power-off signal on line 74 to go to a low state thereby providing a reset signal to flip-flop 62. Flip-flop 62 then changes state thereby causing the signal on line 70 to transit from a low to a high state. As a result, flip-flop 65 which has the signal on line 70 as its set input, is not then being set and can therefore be clocked. Divide down counter 61 then counts up to 2 seconds and it raises its 2 second output signal on line 81 which clocks in a low signal to flip-flop 65. This low signal disables power.

During a powering-off sequence, a system suspend NMI signal on line 75 is generated to signal any software running on the system that a power down sequence is now underway. This signaling process is accomplished using pulse generator 64. When the signal on line 70 transits from a low to a high state, pulse generator 64 generates a pulse which sets flip-flop 69 thereby causing line 75 to go to a high state thereby signaling the software to begin the suspend sequence.

While the invention has been particularly shown and described with reference to a preferred embodiment it will be understood by those skilled in the art that various other changes in form and detail may be made without departing from the spirit and scope of the invention.

What is claimed is:

1. In an information processing system including a central processor, memory, and a plurality of input-output devices, a method of controlling the operation of said information processing system comprising the steps of:
   detecting the initiation of a powering-off sequence of said information processing system;
   accessing system profile data stored within said memory to determine whether a resume mode is set;
   saving, in response to said resume mode being set, the state of all memory locations, the state of said plurality of input-output devices, and all interrupt, register and display data in said memory; and
   setting a system flag prior to the removal of power from said system in response to said saving step thereby suspending the operation of said information processing system.

2. The method according to claim 1 further comprises the steps of:
   disabling all interrupts in said system in response to said detecting step;
   performing a first checksum operation on said memory subsequent to said saving step; and
   halting operation of each of said plurality of input-output devices.

3. The method according to claim 2 further includes the steps of:
   detecting the application of power to said system;
   determining whether said system is to be resumed in said saved states;
   performing a second checksum operation on said memory in response to said determination that said system is to be resumed in said saved states;
   comparing the results of said first and said second checksum operations;
   restoring, in response to the results of said first checksum operation being equal to that of said second checksum operation, all memory locations, of each of said plurality of input-output devices, register and display devices to the states existing at the time said system was suspended; and
   resuming operation of said system at the point at which it was suspended in response to said restoring step.

4. In an information processing system including a central processor on which an application program is executing, memory, and a plurality of input-output devices, a method of controlling the execution of said application program on said system comprising the steps of:
   detecting the initiation of a powering-off sequence of said information processing system;
   accessing system profile data stored within said memory to determine whether a resume mode is set;
   saving, in response to said resume mode being set, the state of all memory locations, the state of said plurality of input-output devices, and all interrupt, register and display data in said memory; and,
   setting a system flag prior to the removal of power from said system in response to said saving step thereby suspending the execution of said application program on said system.

5. The method according to claim 4 further comprises the steps of:
   disabling all interrupts in said system in response to said detecting step;
   performing a first checksum operation on said memory subsequent to said saving step; and
   halting operation of each of said plurality of input-output devices.

6. The method according to claim 5 further includes the steps of:
- detecting the application of power to said system;
- determining whether said system is to be resumed in said saved states;
- performing a second checksum operation on said memory in response to said determination that said system is to be resumed in said saved states;
- comparing the results of said first and said second checksum operations;
- restoring, in response to the results of said first checksum operation being equal to that of said second checksum operation, all memory locations, each of said plurality of input-output devices, register and display devices to the states existing at the time said application program was suspended; and
- resuming execution of said application program at the point at which said program was suspended in response to said restoring step.

7. The method according to claim 6 wherein said saved states are stored in a suspend area of said memory further includes the step of accessing said suspend area of said memory.

8. The method according to claim 7 further includes the step of disabling access to said suspend are prior to said resuming step.

9. The method according to claim 8 wherein said resuming step includes the steps of:
- transmitting a resume call to an operating system program which controls said information processing system;
- restoring a printer in said information processing system to the state which existed at the time said application program was suspended; and
- updating the present time and date in response to a real time clock in said information processing system.

10. The method according to claim 4 wherein said saving step comprises the step of activating a suspend area of said memory for storing the state of said memory locations, the state of each of said plurality of input-output devices and all interrupt, register and display data.

11. The method according to claim 10 further includes the step of performing a checksum operation on said suspend area as well as on the remainder of said memory.

12. A system for controlling the execution of an application program on an information processing system comprising:
- means for detecting the initiation of a powering-off sequence of said information processing system;
- means, coupled to said detecting means, for accessing a system profile data stored within said information processing system to determine whether a resume mode is set;
- means, coupled to said accessing means, for saving the state of all memory locations, the state of all input-output devices coupled to said system, and all interrupt, register and display data, in response to said resume mode being set; and,
- means for setting a system flag prior to the removal of power from said system in response to said saved states being stored in said saving means thereby suspending the execution of said application program on said system.

13. The system according to claim 12 further comprises:
- means for disabling all interrupts in said system;
- means, coupled to said saving means, for performing a first checksum operation on said saving means; and
- means for halting operation of each of said plurality of input-output devices in response to a signal generated by said detecting means.

14. The system according to claim 13 further includes:
- means for detecting the application of power to said system;
- means for determining whether said operation of said system is to be resumed in said saved states;
- means for performing a second checksum operation on said saving means in response to said determining means indicating that said system is to be resumed in said saved states;
- means for comparing the results of said first and said second checksum operations;
- means, responsive to said comparing means, for restoring the state of all memory locations, each of said input-output devices, register and display devices to the states existing at the time said application program was suspended; and
- means for resuming execution of said application program at the point at which said application program was suspended.

15. The system according to claim 14 wherein said saved states are stored in a suspend said memory further includes means for accessing said suspend memory.

16. The system according to claim 15 further includes means for disabling access to said suspend memory in response to the restoring of said saved states.

17. The system according to claim 16 wherein said resuming means includes:
- means for transmitting a resume call to an operating system program which controls said information processing system;
- means for restoring a printer in said information processing system to the state which existed at the time said application program was suspended; and
- means for updating the present time and date in response to a real time clock in said information processing system.

18. The system according to claim 12 wherein said saving means comprises a suspend memory and main memory and wherein said selected memory locations, the state of each of said input-output devices and all interrupt, register and display data are stored in said suspend memory.

19. The system according to claim 18 further includes means for performing a checksum operation on said suspend memory as well as on said main memory.

* * * * *